United States Patent
Sekar et al.

(10) Patent No.: US 11,218,594 B1
(45) Date of Patent: Jan. 4, 2022

(54) SYSTEM AND METHOD FOR CREATING BOTS FOR AUTOMATING FIRST PARTY TOUCHPOINTS

(71) Applicant: GENESYS TELECOMMUNICATIONS LABORATORIES, INC., Daly City, CA (US)

(72) Inventors: Archana Sekar, Chennai (IN); Ravikumar Gopal, Chennai (IN)

( * ) Notice: Subject to any disclaimer, the term of this patent is extended or adjusted under 35 U.S.C. 154(b) by 0 days.

(21) Appl. No.: 16/990,558

(22) Filed: Aug. 11, 2020

(51) Int. Cl.
- *H04M 3/00* (2006.01)
- *H04M 3/51* (2006.01)
- *G06F 16/22* (2019.01)
- *G06F 9/54* (2006.01)
- *G06F 40/30* (2020.01)

(52) U.S. Cl.
CPC .......... *H04M 3/5183* (2013.01); *G06F 9/547* (2013.01); *G06F 16/22* (2019.01); *G06F 40/30* (2020.01); *H04M 3/5166* (2013.01)

(58) Field of Classification Search
CPC ... H04M 3/5183; H04M 3/5166; G06F 16/22; G06F 40/30; G06F 9/547
USPC ....... 379/265.01–265.14, 266.01–266.1, 309
See application file for complete search history.

(56) References Cited

U.S. PATENT DOCUMENTS

| | | | |
|---|---|---|---|
| 10,810,056 B2* | 10/2020 | Nitta | G06F 40/30 |
| 11,025,566 B2* | 6/2021 | Blandin | G06N 5/022 |
| 11,086,701 B2* | 8/2021 | Gonczi | H04L 49/3018 |
| 2019/0018657 A1* | 1/2019 | Landowski | G06F 8/34 |
| 2020/0341970 A1* | 10/2020 | Rodrigues | G06F 16/219 |
| 2021/0064828 A1* | 3/2021 | Premkumar | G06F 40/51 |
| 2021/0117895 A1* | 4/2021 | Tondevold | G06Q 10/06316 |
| 2021/0160377 A1* | 5/2021 | Nakano | H04M 11/04 |
| 2021/0266269 A1* | 8/2021 | McBride | G06N 3/04 |
| 2021/0266376 A1* | 8/2021 | McBride | H04L 67/10 |

* cited by examiner

*Primary Examiner* — William J Deane, Jr.

(57) ABSTRACT

A system and method are presented for creating bots for automating first party touchpoints with contact centers. Software bots created using Robotic Process Automation (RPA) are integrated with a contact center's different customer touch points (e.g. chatbots, emails and SMS, websites, IVR application, mobile applications, agent workstation). Artificial intelligence behind the touch points finds the intent of an interaction and the respective RPAs to be triggered using a fulfillment engine that finds and executes the appropriate fulfillment for each interaction intent. A REST API Request is sent to an RPA execution server, which runs the selected RPA and sends the result to the respective touch point that triggered it.

17 Claims, 5 Drawing Sheets

SYSTEM AND METHOD FOR CREATING BOTS FOR AUTOMATING FIRST PARTY TOUCHPOINTS

BACKGROUND

The present invention generally relates to customer interaction management systems and methods, as well as automation of business processes. More particularly, the present invention pertains to the creation of bots for automating the business processes.

SUMMARY

A system and method are presented for creating bots for automating first party touchpoints with contact centers. Software bots created using Robotic Process Automation (RPA) are integrated with a contact center's different customer touch points (e.g. chatbots, emails and SMS, websites, IVR application, mobile applications, agent workstation). Artificial intelligence behind the touch points finds the intent of an interaction and the respective RPAs to be triggered using a fulfillment engine that finds and executes the appropriate fulfillment for each interaction intent. A REST API Request is sent to an RPA execution server, which runs the selected RPA and sends the result to the respective touch point that triggered it.

In one embodiment, a method is presented for selecting a software bot from a repository comprising a plurality of software bots to execute automatic processes in a contact center environment, the method comprising the steps of: receiving an inbound interaction from a first party at a contact center touchpoint; analyzing, by an intent recognition module, the first party interaction to determine intent; communicating the determined intent to a fulfillment engine associated with the touchpoint; selecting a software bot through comparing intent with metadata stored in a library; gathering, by the fulfillment engine, required arguments from the first party; preparing an API request as a result of the gathered arguments and sending to an execution server through a Rest API with the arguments; and selecting, by the execution server, the selected software bot from a repository and executing the software bot, with the results being returned to the touchpoint.

The touchpoints comprise one of: conversational chatbot, email, SMS, website, IVR application, mobile application, or agent workstation. The repository comprises a database for storing the plurality of software bots, execution files, and metadata. The library comprises a listing of metadata and corresponding Rest API requests.

The results may be delivered to the first party through a channel instructed by the first party. The channel may be a different channel than the channel the inbound interaction was initiated from.

In another embodiment, a system is presented for selecting a software bot from a repository comprising a plurality of software bots to execute automatic processes in a contact center environment comprising: a processor; and a memory in communication with the processor, the memory storing instructions that, when executed by the processor, causes the processor to execute the software bot by: receiving an inbound interaction from a first party at a contact center touchpoint; analyzing, by an intent recognition module, the first party interaction to determine intent; communicating the determined intent to a fulfillment engine associated with the touchpoint; selecting a software bot through comparing intent with metadata stored in a library; gathering, by the fulfillment engine, required arguments from the first party; preparing an API request as a result of the gathered arguments and sending to an execution server through a Rest API with the arguments; and selecting, by the execution server, the selected software bot from a repository and executing the software bot, with the results being returned to the touchpoint.

The touchpoints comprise one of: conversational chatbot, email, SMS, website, IVR application, mobile application, or agent workstation. The repository comprises a database for storing the plurality of software bots, execution files, and metadata. The library comprises a listing of metadata and corresponding Rest API requests.

The results may be delivered to the first party through a channel instructed by the first party. The channel may be a different channel than the channel the inbound interaction was initiated from.

In another embodiment, a system is presented for selecting a software bot from a repository comprising a plurality of software bots to execute automatic processes in a contact center environment comprising: a contact center touchpoint for receiving an inbound interaction from a first party; an intent recognition module operably connected to the touchpoint for determining intent of the interaction; a fulfillment engine operably coupled to the intent recognition module for receiving the determined intent, and for gather requirement arguments from the first party; a library operably coupled to the fulfillment engine for providing metadata to the fulfillment engine; an execution server operatively coupled to the fulfillment engine, wherein the execution server, in response to a request from the fulfillment engine, selects the software bot from the plurality of software bots stored; and a repository operative coupled to the execution server, wherein the repository stores the plurality of software bots.

The fulfillment engine is capable of preparing an API request as a result of the gathered arguments and sending to the execution server through a Rest API with the arguments. The touchpoints comprise one of: conversational chatbot, email, SMS, website, IVR application, mobile application, or agent workstation. The repository comprises a database for storing the plurality of software bots, execution files, and metadata. The library comprises a listing of metadata and corresponding Rest API requests.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In an enterprise or a contact center environment, a series of problems exist that can be automated. These problems comprise statements that may be: very repetitive in nature, involve very little/no intelligence, constantly trend within the environment, are most frequently asked by the customers, or are static/never changing processes with defined steps (e.g., address changes, profile information updates, simple workflows, etc.). When these problem statements are defined, software bots can be created through a robotic process automation (RPA) tool (e.g., UI Path, Blue Prism, Kryon, etc.). In an embodiment, RPA is a technology that helps to automate business processes by creating executable software bots. The software bot comprises an executable workflow that executes a list of steps. The bot, along with the metadata that includes all of the arguments that are required for the bot to run successfully are added into a repository for that environment. The repository comprises a database that saves the actual software bot and RPAs along with the metadata and may be accessed by an execution server. The metadata and arguments associated with a bot are also pushed to the repository along with the API Request to trigger each one. The RPA library is utilized by different interaction touchpoints with the contact center.

Contact Center Systems

Figure 1:
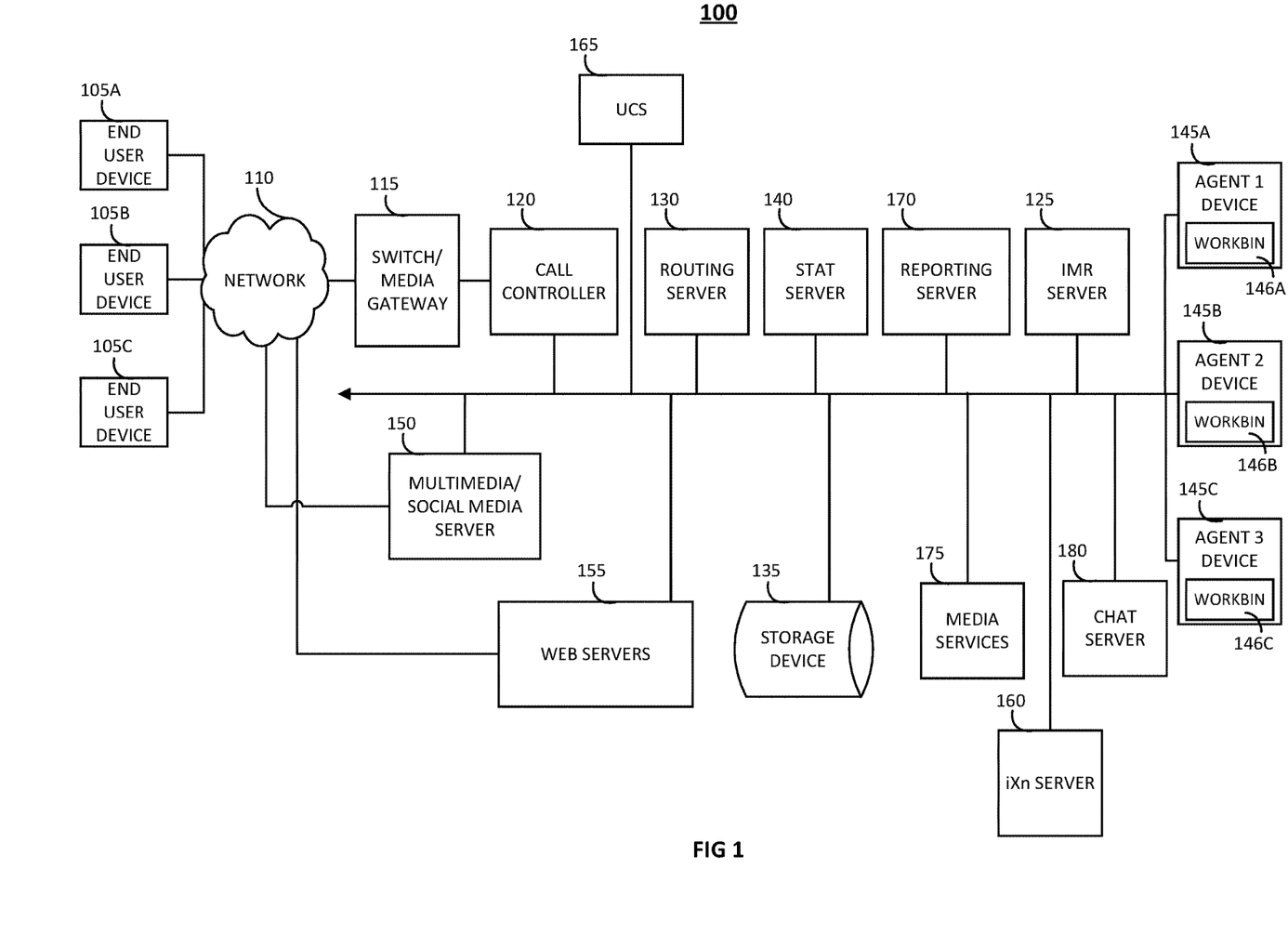
FIG. 1 is a diagram illustrating an embodiment of a communication infrastructure.

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc, and hosts applications 205d (FIG. 2) to facilitate automated customer interaction with the contact center 100. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140. In another embodiment, the communication may be routed to a chat bot 205a (FIG. 2) via a platform on a chat server 180.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email 205b (FIG. 2), vmail (voice mail through email), chat, video, text-messaging, websites 205c (FIG. 2), social media, co-browsing, etc. The multi-media/social media server 150 may take the form of any IP router conventional in the art with specialized hardware and software for receiving, processing, and forwarding multi-media events (including, for example, mobile applications 205e (FIG. 2)).

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent or entity (e.g., a chat bot) to handle the activity. In an embodiment, once the interaction is assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the interaction is assigned to a bot for handling. The interaction server 160 will route the interaction to a chat server 180, which communicates via platform with the bot. The chat server 180 is capable of conducting a plurality of chat sessions with a bot. A platform implemented on the server deploys various chat bots which participate in the chat sessions. A workflow initiates and stops the bot, as well as sending data to the bot.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through user interfaces (UIs) present on the agent devices 145A-C. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment, with components being accessed through the user interfaces (UIs) present on the agent devices 145A-C. The agent devices 145A-C may also be referred to herein as agent workstations 205f (FIG. 2) through which an agent may also access intelligent assisting applications, such as those embodiments described herein. For the sake of convenience, aspects of embodiments of the present invention will be described below with respect to providing modular tools from a cloud-based environment to components housed on-premises.

Figure 2:
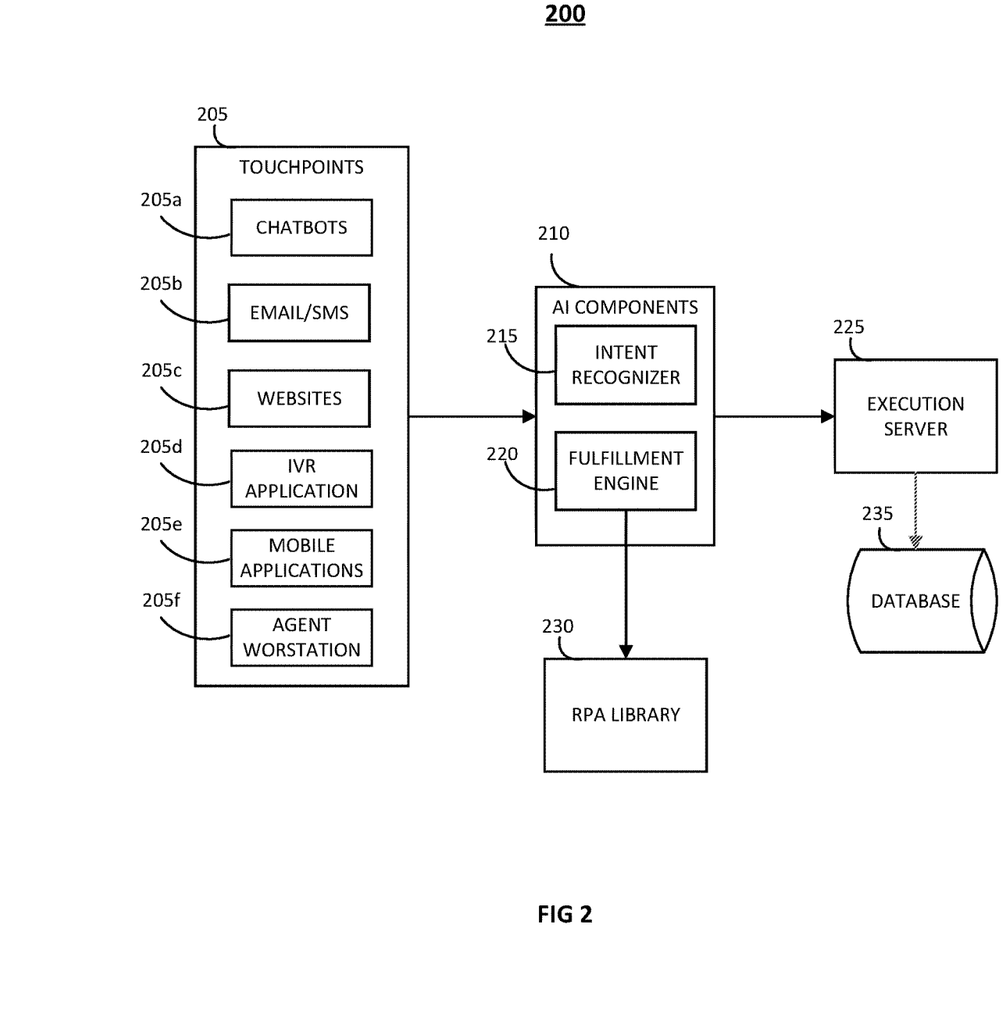
FIG. 2 is a diagram illustrating an embodiment of integrating RPA with customer touchpoints.

FIG. 2 is a diagram illustrating an embodiment of integrating RPA with customer touchpoints, indicated generally at 200. The execution server 225 works through a HTTP Request to trigger the respective software bot from the repository 235 using the right arguments. The execution server 225 comprises the required RPA execution libraries/software to run the RPAs saved in the repository 235. The metadata (including arguments and descriptions of the bots) will also be updated in the RPA library 230 of each environment. The RPA library 230 comprises a listing of all RPA metadata along with the REST API request. The RPA library 230 is used by a Fulfillment engine 220 coupled with an Intent Recognizer 215 sitting behind the customer's interaction touchpoints 205 (e.g., chatbots 205a, emails and SMS 205b, websites 205c, IVR application 205d, mobile applications 205e, agent workstation 205f) to trigger the right software bot based on the customer's interaction intent. Examples of an Intent Recognizer 215 include the Genesys® Dialog Engine platform, the Google Dialog Flow platform, the Microsoft Bot Framework, etc., to name a few non-limiting examples. As part of the fulfillment for the found intent, the artificial intelligence 210 behind the interactive touchpoints triggers the respective RPA's REST API request from the RPA library 230. The RPA execution server 225 triggers the respective RPA.

The interaction touchpoints 205 comprise chatbots 205a, emails and SMS 205b, websites 205c, IVR application 205d, mobile applications 205e, and agent workstation 205f associated with an environment, such as the contact center 100 (FIG. 1). The touchpoints allow a customer to interact with the contact center 100 through a variety of channels as previous described. In an example, a customer may wish to change the address associated with their account. This is determined as the intent by the recognizer, which conveys this to the fulfillment engine. The engine checks the RPA Library and locates a software bot that can perform the task. A REST API Request is sent to trigger the respective RPA.

Figure 3:
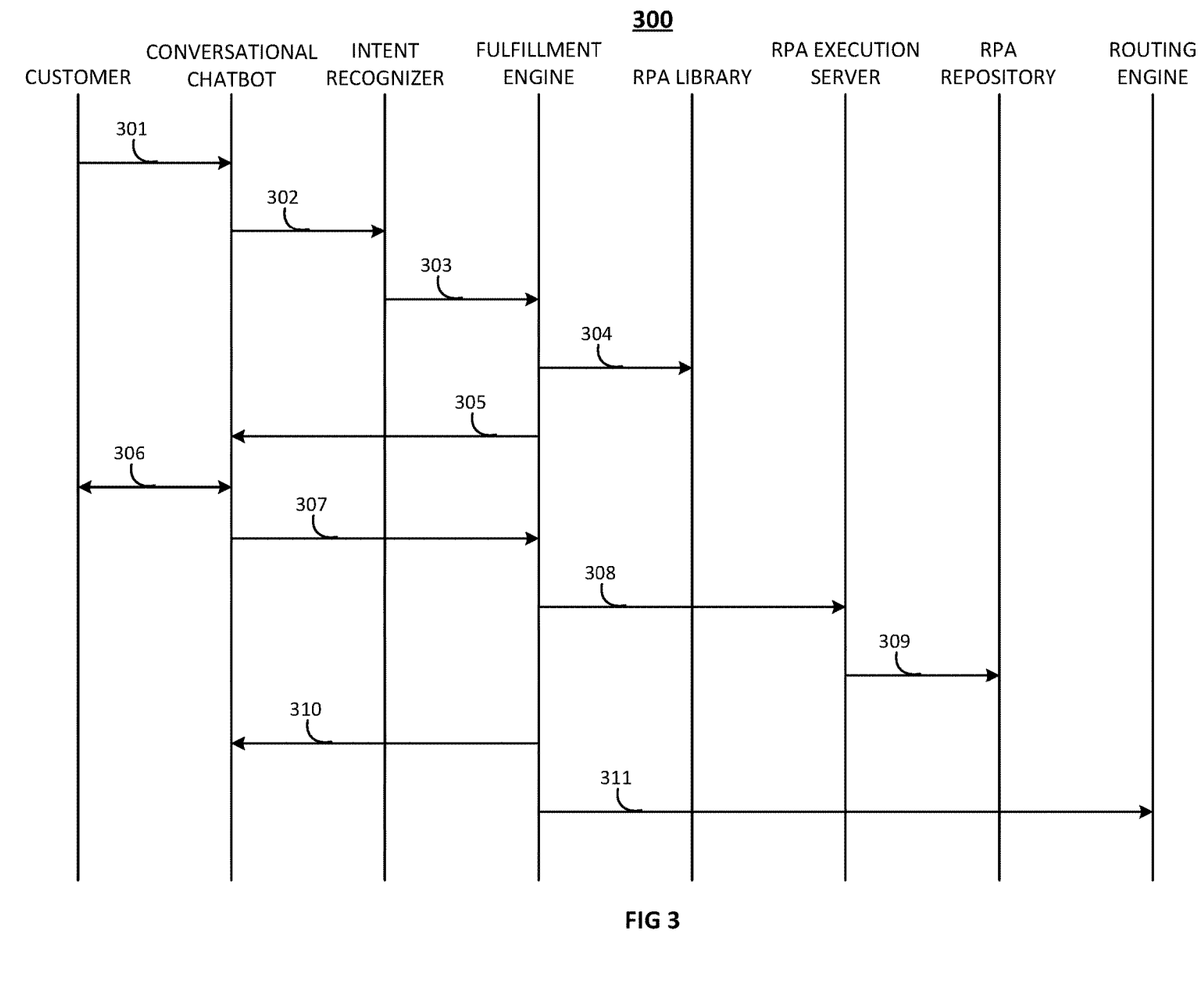
FIG. 3 is a flow diagram illustrating an embodiment of an inbound customer interaction.

FIG. 3 is a flow diagram illustrating an embodiment of an inbound customer interaction, indicated generally at 300. The diagram illustrates an embodiment of a customer interaction that is routed to a chatbot 205a by the contact center 100, for exemplary purposes, however, this should not be construed as limiting as the interaction could be via email, SMS, webchat, IVR, a mobile app, etc. In an embodiment, each of the touchpoints has intelligence running in the background that includes an intent recognizer module to determine the current interaction context as well as the fulfillment engine which uses the intent found and matches with an RPA in the RPA library.

A customer initiates an inbound interaction 301, which is routed through the contact center 100 to a conversational chatbot. The customer interaction is analyzed 302 by the artificial intelligence tools, specifically the intent recognizer 215 to determine the intent of the interaction. When the intent has been determined 303, this is communicated to the fulfillment engine 220. The fulfillment engine 220 determines the RPA to use and obtains the required arguments. The RPA library is used by the fulfillment to compare the intent with the metadata in the library 304. The fulfillment engine 220 requests missing arguments 305 from the conversational chatbot. The conversational chatbot interacts with the customer to obtain this information 306. The collected arguments are returned by the conversational chatbot to the fulfillment engine 307. The fulfillment engine prepares the API Request, which is sent as a REST API with the arguments 308 to the RPA Execution Server. The RPA Execution Server queries the RPA repository for the requested RPA 309 and executes. If arguments were not filled or the RPA could not be found, the fulfillment engine can indicate to the conversation chatbot 310 that the interaction should be routed from the conversational chatbot to an agent. The fulfillment engine can then route the interaction to an agent via a routing engine within the contact center environment 311.

In an embodiment, chatbot integration with RPA allows a chatbot to invoke another software bot. When a customer interacts with a contact center through its chat bot, generally a chatbot will try to resolve the queries by redirecting the interaction to an agent. If a query is repetitive, more frequently asked, or involves less intelligence, this is not an optimal use of resources in the contact center. In an example, a customer might want to know their claim status with an insurance agency. When a chatbot receives a request that is associated with a software bot, the chatbot's intent recognizer determines the intent of the customer's interaction. In this example, the intent is the 'claim status'. The fulfillment engine coupled with the intent recognizer determines the respective RPA by checking the metadata in the RPA library. Once found, the required arguments are gathered as inputs from the customer (or as programmed in the bot). The Rest API is created and sent to the RPA Execution Server, which runs the respective software bot requested. The software bot will rightly finish the complete action and return the success/failure response to the intent recognizer, which in turn is delivered to the customer through any channel as instructed.

For inbound emails and SMS, the orchestration server (FIG. 1, 130) receives the Email/SMS in the contact center. The orchestration server communicates with the intent recognizer in order to run the processes similar to that for the chatbot touchpoint. Once the intent has been obtained, the fulfillment engine with the assistance of the RPA library determines if a matching RPA exists. If yes, then the required arguments for invoking the RPA are fetched from the customer or from the text of the email/SMS. When all of the arguments have been collected, the Rest API request for invoking the selected RPA is triggered. If the orchestration server cannot make out the arguments, or the fulfillment engine cannot determine a matching RPA exists, then the interaction is routed to an agent for handling.

For outbound emails and SMS, a contact center may be sending promotion emails/SMS to a customer. These comprise embedded links, and when the clicks the embedded link, they reach a dedicated web server which finds a software bot as the configured fulfillment to the query, which thereby refers to the RPA library for the respective software bot to begin processing. For example, a customer checks their email/SMS and finds a promotional email from their phone service provider that their current phone can avail a yearly free insurance as part of the promotion. The customer is provided with a link for registration. When the customer clicks on the link, the background processing of enrolling the customer to an insurance policy begins with initiating an insurance enrollment bot instantly. A web server receives the interaction and begins the process as described.

In another embodiment, when a customer is browsing a website, the intent of this website interaction can be determined by the clicks made on the webpage as well as analysis of the pages the customer has tried to reach out to. Information around the customer journey with the website is collected and analyzed through predictive engagement technologies and determines when the customer needs assistance and proactively initiates a web chat between the customer and a chatbot. Here, the customer is looking for a way to change their delivery address of an order already placed. Website monitoring tools work with the intent recognizer and the fulfillment engine to determine the intent ("change address") and find the change delivery address bot within the RPA Library in the processes previously described.

In another embodiment, a natural language IVR can discern the intent and communicate this to the artificial intelligence 210. For numerical-based IVR systems, created with manual configuration tools, the appropriate IVRs can be linked with an IVR node respectively and when the user reaches the node, respective arguments are obtained from the user. Rest APIs are triggered to the RPA execution server.

The embodiments described herein can also be used to assist agents in contact centers. For example, an agent may be handling a call with a retail store customer about receiving defective products in the most recent shipment. The agent assures the customer that they will place a request to replace the products. The interaction ends and the agent begins their after-call work, which mainly involves filling out the replacement order forms for the customer along with other manual, repetitive tasks. An agent assist solution, like the Agent Assist platform from Genesys, that provides real-time transcription and knowledge suggestions based on the context of a live conversation between a customer and an agent, can be leveraged as they have their own intent recognizers. The intent recognizer can determine the conversation's intent is around creating a replacement request for the Customer, and as part of the fulfillment, respective RPAs from the RPA library can be triggered.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 4A, 4B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 4A:
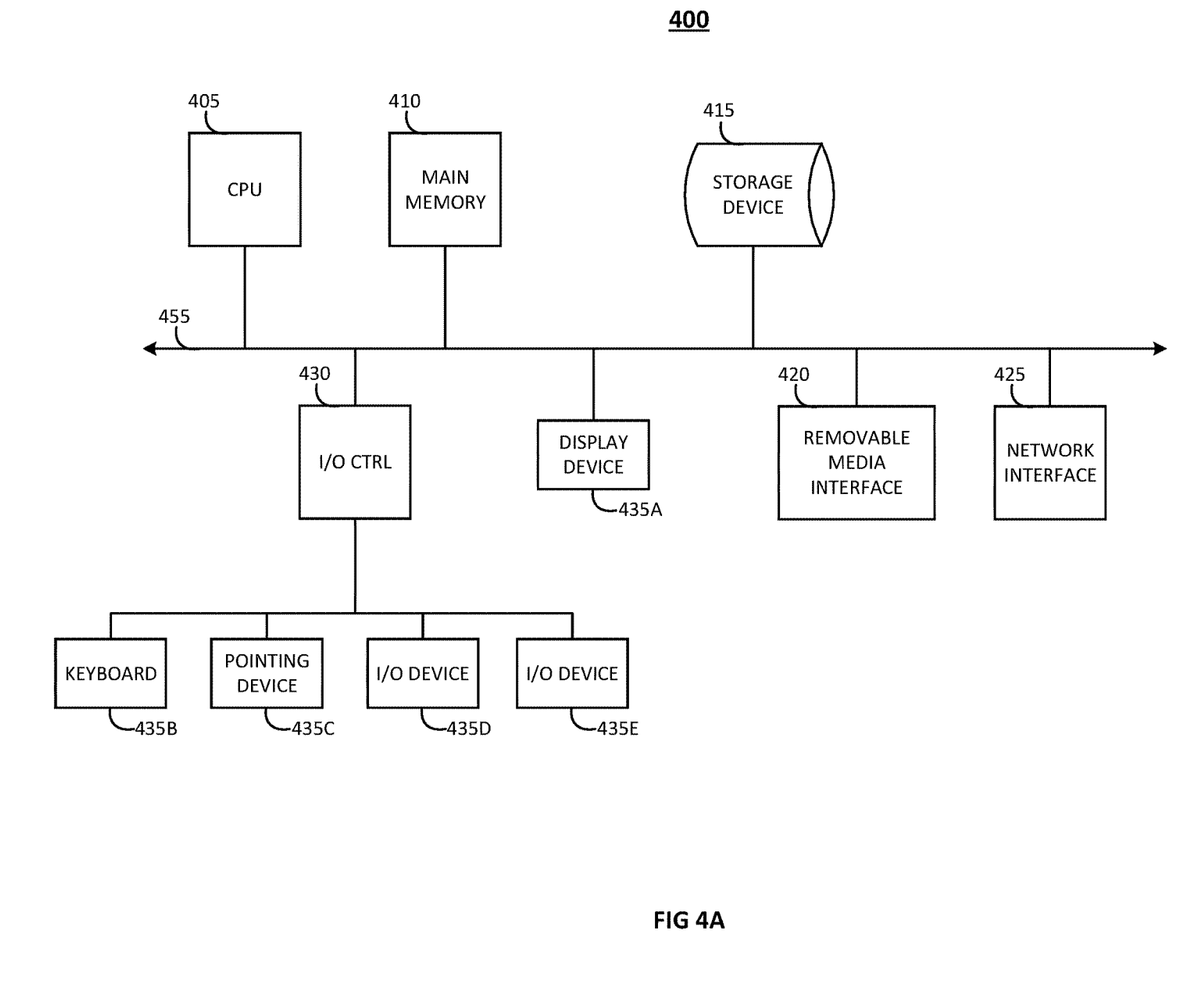
FIG. 4A is a diagram illustrating an embodiment of a computing device.
Figure 4B:
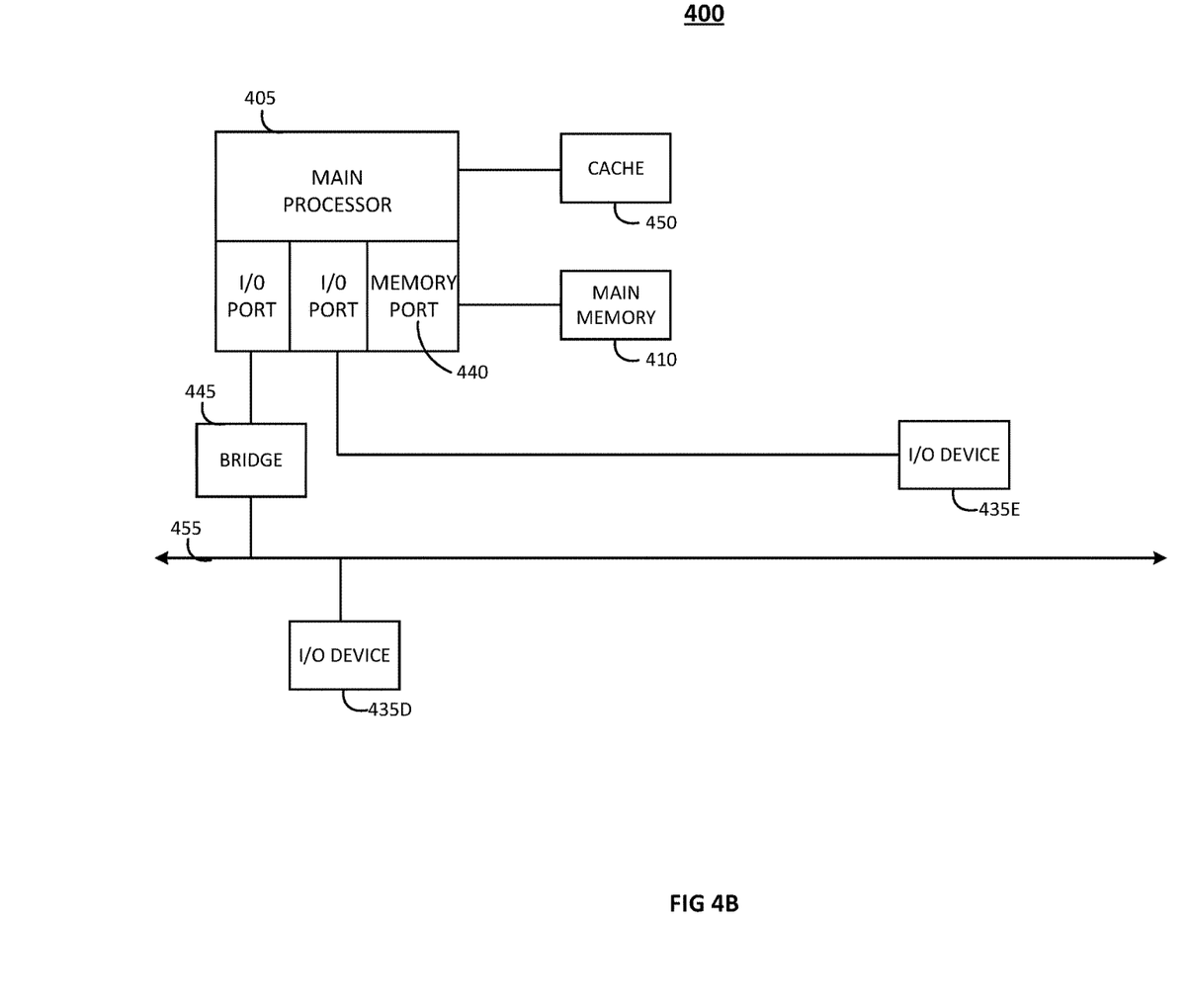
FIG. 4B is a diagram illustrating an embodiment of a computing device.

FIGS. 4A and 4B are diagrams illustrating an embodiment of a computing device as may be employed in an embodiment of the invention, indicated generally at 400. Each computing device 400 includes a CPU 405 and a main memory unit 410. As illustrated in FIG. 4A, the computing device 400 may also include a storage device 415, a removable media interface 420, a network interface 425, an input/output (I/O) controller 430, one or more display devices 435A, a keyboard 435B and a pointing device 435C (e.g., a mouse). The storage device 415 may include, without limitation, storage for an operating system and software. As shown in FIG. 4B, each computing device 400 may also include additional optional elements, such as a memory port 440, a bridge 445, one or more additional input/output devices 435D, 435E, and a cache memory 450 in communication with the CPU 405. The input/output devices 435A, 435B, 435C, 435D, and 435E may collectively be referred to herein as 435.

The CPU 405 is any logic circuitry that responds to and processes instructions fetched from the main memory unit 410. It may be implemented, for example, in an integrated circuit, in the form of a microprocessor, microcontroller, or graphics processing unit, or in a field-programmable gate array (FPGA) or application-specific integrated circuit (ASIC). The main memory unit 410 may be one or more memory chips capable of storing data and allowing any storage location to be directly accessed by the central processing unit 405. As shown in FIG. 4A, the central processing unit 405 communicates with the main memory 410 via a system bus 455. As shown in FIG. 4B, the central processing unit 405 may also communicate directly with the main memory 410 via a memory port 440.

In an embodiment, the CPU 405 may include a plurality of processors and may provide functionality for simultaneous execution of instructions or for simultaneous execution of one instruction on more than one piece of data. In an embodiment, the computing device 400 may include a parallel processor with one or more cores. In an embodiment, the computing device 400 comprises a shared memory parallel device, with multiple processors and/or multiple processor cores, accessing all available memory as a single global address space. In another embodiment, the computing device 400 is a distributed memory parallel device with multiple processors each accessing local memory only. The computing device 400 may have both some memory which is shared and some which may only be accessed by particular processors or subsets of processors. The CPU 405 may include a multicore microprocessor, which combines two or more independent processors into a single package, e.g., into a single integrated circuit (IC). For example, the computing device 400 may include at least one CPU 405 and at least one graphics processing unit.

In an embodiment, a CPU 405 provides single instruction multiple data (SIMD) functionality, e.g., execution of a single instruction simultaneously on multiple pieces of data. In another embodiment, several processors in the CPU 405 may provide functionality for execution of multiple instructions simultaneously on multiple pieces of data (MIMD). The CPU 405 may also use any combination of SIMD and MIMD cores in a single device.

FIG. 4B depicts an embodiment in which the CPU 405 communicates directly with cache memory 450 via a secondary bus, sometimes referred to as a backside bus. In other embodiments, the CPU 405 communicates with the cache memory 450 using the system bus 455. The cache memory 450 typically has a faster response time than main memory 410. As illustrated in FIG. 4A, the CPU 405 communicates with various I/O devices 435 via the local system bus 455. Various buses may be used as the local system bus 455, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 435A, the CPU 405 may communicate with the display device 435A through an Advanced Graphics Port (AGP). FIG. 4B depicts an embodiment of a computer 400 in which the CPU 405 communicates directly with I/O device 435E. FIG. 4B also depicts an embodiment in which local buses and direct communication are mixed: the CPU 405 communicates with I/O device 435D using a local system bus 455 while communicating with I/O device 435E directly.

A wide variety of I/O devices 435 may be present in the computing device 400. Input devices include one or more keyboards 435B, mice, trackpads, trackballs, microphones, and drawing tables, to name a few non-limiting examples. Output devices include video display devices 435A, speakers and printers. An I/O controller 430 as shown in FIG. 4A, may control the one or more I/O devices, such as a keyboard 435B and a pointing device 435C (e.g., a mouse or optical pen), for example.

Referring again to FIG. 4A, the computing device 400 may support one or more removable media interfaces 420, such as a floppy disk drive, a CD-ROM drive, a DVD-ROM drive, tape drives of various formats, a USB port, a Secure Digital or COMPACT FLASH' memory card port, or any other device suitable for reading data from read-only media, or for reading data from, or writing data to, read-write media. An I/O device 435 may be a bridge between the system bus 455 and a removable media interface 420.

The removable media interface 420 may, for example, be used for installing software and programs. The computing device 400 may further include a storage device 415, such as one or more hard disk drives or hard disk drive arrays, for storing an operating system and other related software, and for storing application software programs. Optionally, a removable media interface 420 may also be used as the storage device. For example, the operating system and the software may be run from a bootable medium, for example, a bootable CD.

In an embodiment, the computing device 400 may include or be connected to multiple display devices 435A, which each may be of the same or different type and/or form. As such, any of the I/O devices 435 and/or the I/O controller 430 may include any type and/or form of suitable hardware, software, or combination of hardware and software to support, enable or provide for the connection to, and use of, multiple display devices 435A by the computing device 400. For example, the computing device 400 may include any type and/or form of video adapter, video card, driver, and/or library to interface, communicate, connect or otherwise use the display devices 435A. In an embodiment, a video adapter may include multiple connectors to interface to multiple display devices 435A. In another embodiment, the computing device 400 may include multiple video adapters, with each video adapter connected to one or more of the display devices 435A. In other embodiments, one or more of the display devices 435A may be provided by one or more other computing devices, connected, for example, to the computing device 400 via a network. These embodiments may include any type of software designed and constructed to use the display device of another computing device as a second display device 435A for the computing device 400. One of ordinary skill in the art will recognize and appreciate the various ways and embodiments that a computing device 400 may be configured to have multiple display devices 435A.

An embodiment of a computing device indicated generally in FIGS. 4A and 4B may operate under the control of an operating system, which controls scheduling of tasks and access to system resources. The computing device 400 may be running any operating system, any embedded operating system, any real-time operating system, any open source operation system, any proprietary operating system, any operating systems for mobile computing devices, or any other operating system capable of running on the computing device and performing the operations described herein.

The computing device 400 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 400 may have different processors, operating systems, and input devices consistent with the device.

In other embodiments, the computing device 400 is a mobile device. Examples might include a Java-enabled cellular telephone or personal digital assistant (PDA), a smart phone, a digital audio player, or a portable media player. In an embodiment, the computing device 400 includes a combination of devices, such as a mobile phone combined with a digital audio player or portable media player.

A computing device 400 may be one of a plurality of machines connected by a network, or it may include a plurality of machines so connected. A network environment may include one or more local machine(s), client(s), client node(s), client machine(s), client computer(s), client device (s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 400 communicates with other computing devices 400 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

In an embodiment, the use of LSH to automatically discover carrier audio messages in a large set of pre-connected audio recordings may be applied in the support process of media services for a contact center environment. For example, this can assist with the call analysis process for a contact center and removes the need to have humans listen to a large set of audio recordings to discover new carrier audio messages.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for selecting a software bot from a repository comprising a plurality of software bots to
   execute automatic processes in a contact center environment, the method comprising the steps of:
   receiving an inbound interaction from a first party at a contact center touchpoint;
   analyzing, by an intent recognition module, the first party interaction to determine intent;
   communicating the determined intent to a fulfillment engine associated with the touchpoint;
   selecting a software bot through comparing intent with metadata stored in a library;
   gathering, by the fulfillment engine, required arguments from the first party;
   preparing an API request as a result of the gathered arguments and sending to an execution server through a Rest API with the arguments; and
   selecting, by the execution server, the selected software bot from a repository and executing the
   software bot, with the results being returned to the touchpoint.

2. The method of claim 1, wherein the touchpoints comprise one of: conversational chatbot, email, SMS, website, IVR application, mobile application, or agent workstation.

3. The method of claim 1, wherein the repository comprises a database for storing the plurality of software bots, execution files, and metadata.

4. The method of claim 1, wherein the library comprises a listing of metadata and corresponding Rest API requests.

5. The method of claim 1, further comprising the step of delivering the results to the first party through a channel instructed by the first party.

6. The method of claim 5, wherein the channel is an other channel than the inbound interaction was initiated from.

7. A system for selecting a software bot from a repository comprising a plurality of software bots to execute automatic processes in a contact center environment comprising:
a processor; and
a memory in communication with the processor, the memory storing instructions that, when executed by the processor, causes the processor to execute the software bot by:
receiving an inbound interaction from a first party at a contact center touchpoint;
analyzing, by an intent recognition module, the first party interaction to determine intent;
communicating the determined intent to a fulfillment engine associated with the touchpoint;
selecting a software bot through comparing intent with metadata stored in a library;
gathering, by the fulfillment engine, required arguments from the first party;
preparing an API request as a result of the gathered arguments and sending to an execution server through a Rest API with the arguments; and
selecting, by the execution server, the selected software bot from a repository and executing the software bot, with the results being returned to the touchpoint.

8. The system of claim 7, wherein the touchpoints comprise one of: conversational chatbot, email, SMS, website, IVR application, mobile application, or agent workstation.

9. The system of claim 7, wherein the repository comprises a database for storing the plurality of software bots, execution files, and metadata.

10. The system of claim 7, wherein the library comprises a listing of metadata and corresponding Rest API requests.

11. The system of claim 7, wherein the instructions further comprise delivering the results to the first party through a channel instructed by the first party.

12. The system of claim 11, wherein the channel is an other channel than the inbound interaction was initiated from.

13. A system for selecting a software bot from a repository comprising a plurality of software bots to
execute automatic processes in a contact center environment comprising:
a contact center touchpoint for receiving an inbound interaction from a first party;
an intent recognition module operably connected to the touchpoint for determining intent of the interaction;
a fulfillment engine operably coupled to the intent recognition module for receiving the determined intent, and for gather requirement arguments from the first party;
a library operably coupled to the fulfillment engine for providing metadata to the fulfillment engine;
an execution server operatively coupled to the fulfillment engine, wherein the execution server, in response to a request from the fulfillment engine, selects the software bot from the plurality of software bots stored; and
a repository operative coupled to the execution server, wherein the repository stores the plurality of software bots.

14. The system of claim 13, wherein the fulfillment engine is capable of preparing an API request as a result of the gathered arguments and sending to the execution server through a Rest API with the arguments.

15. The system of claim 13, wherein the touchpoints comprise one of: conversational chatbot, email, SMS, website, IVR application, mobile application, or agent workstation.

16. The system of claim 13, wherein the repository comprises a database for storing the plurality of software bots, execution files, and metadata.

17. The system of claim 13, wherein the library comprises a listing of metadata and corresponding Rest API requests.

* * * * *